United States Patent
Tsutsumi

[15] 3,655,363
[45] Apr. 11, 1972

[54] METHOD OF RECOVERING PALLADIUM

[72] Inventor: Mitsutoshi Tsutsumi, Kurashiki, Japan
[73] Assignee: Kuraray Co., Ltd., Kurashiki, Japan
[22] Filed: Oct. 23, 1970
[21] Appl. No.: 83,617

[52] U.S. Cl. ..............................75/101 R, 75/108, 75/121, 75/103, 75/106, 75/105
[51] Int. Cl. ...................................C22b 11/04, C22b 11/08
[58] Field of Search.....................75/121, .5, 105, 106, 107, 75/108, 101 R, 103; 252/412, 472; 23/87 R

[56] References Cited

UNITED STATES PATENTS

| | | |
|---|---|---|
| 3,215,524 | 11/1965 | Fetscher et al. .........................75/106 |
| 3,443,933 | 5/1969 | Boyhan et al. ...........................75/108 |
| 3,471,567 | 10/1969 | Gourlay.............................252/472 X |
| 3,488,144 | 1/1970 | Sargent............................23/87 R |

Primary Examiner—L. Dewayne Rutledge
Assistant Examiner—G. T. Ozaki
Attorney—William Kaufman and Barry Kramer

[57] ABSTRACT

Palladium is recovered from the palladium-containing precipitate formed in a palladium catalyzed alkyleneglycol ester synthesis by a process which comprises dissolving said precipitate in an aqueous solution of at least one of alkaline compound selected from the group consisting of alkali metal hydroxides, alkali metal cyanides and ammonia reducing the palladium compound dissolved in the aqueous solution to form metallic palladium and separating said metallic palladium from the aqueous solution.

6 Claims, No Drawings

METHOD OF RECOVERING PALLADIUM

This invention relates to a method of recovering palladium and particularly relates to a method of recovering metallic palladium (i.e. palladium metal) from a catalytically inert precipitate formed during a palladium catalyzed reaction for synthesizing alkyleneglycol esters.

It is well known that alkyleneglycol esters can be obtained in high yields by oxidizing olefins, using a nitrogen-oxygen-containing compound as an oxidizing agent in a carboxylic acid medium containing a palladium catalyst which is soluble under the reaction conditions. When oxygen is present in the reaction system, the reaction turns into a redox system, palladium acting catalytically.

However, after the reaction has continued for a long period of time, part of the palladium compound becomes insoluble and catalytically inert under the reaction conditions. The insoluble palladium either remains suspended in the reaction mixture, or deposits on the surfaces of the reactor. This phenomenon poses serious problems in the loss of expensive palladium because the precipitates are insoluble and inert under the reaction conditions, and in reduced reaction efficiency.

Efforts to recover the palladium in a reusable form from said precipitate (which will be hereinafter referred to as "-precipitated palladium compounds"), confirmed that the precipitated palladium compound is completely insoluble in organic solvents and mineral acids, but is decomposed by aqua regia and dissolved in the form of palladium chloride.

However, in the method of dissolving said precipitated palladium compound in aqua regia to recover palladium in the form of palladium chloride, it is necessary to evaporate to dryness the liquid containing the dissolved palladium chloride. In view of the corrosive nature of the solution, the apparatus used in the evaporation procedure must be constructed of costly special materials. Consequently, the above method is not suitable for recovering palladium on a commercial scale.

In view of the severe limitations which loss of palladium imposes upon the above-described process and the deficiencies of known methods for preventing these losses it is the primary object of this invention to provide means for recovering precipitated palladium compounds in a manner which is simple, efficient and economical. Other objects will be evident from the ensuing description of this invention.

In accordance with this invention, it has now been found that said precipitated palladium compound is soluble in an aqueous solution of at least one alkaline material selected from the group consisting of alkali metal hydroxides, alkali metal cyanides and ammonia, and that the dissolved palladium in the alkaline aqueous solution can be readily reduced to obtain palladium black in a high yield.

Thus, according to the present invention, there is provided a method of recovering palladium which is characterized in that the precipitated palladium compound which is formed during the reaction of preparing alkyleneglycol esters by contacting an olefin with a carboxylic acid solution containing a palladium catalyst which is soluble under the reaction conditions, in the presence of a nitrogen-oxygen-containing compound, (preferably also in the presence of oxygen), is dissolved in an aqueous solution of at least one alkaline material selected from the group consisting of alkali metal hydroxides, alkali metal cyanides and ammonia; reduced to metallic palladium (palladium black); and then the resulting metallic palladium is separated from the aqueous solution.

In the method according to this invention, it is unnecessary to evaporate to dryness the solution of the precipitated palladium compound, and restrictions on the material for the apparatus to be used, are considerably relaxed. Furthermore, since the palladium black thus obtained can be dissolved in a form of palladium compound in the reaction medium under the reaction conditions for the synthesis of alkyleneglycol esters, it can be reused per se as the catalyst in the reaction of synthesizing the alkyleneglycol esters, so that in recovering the palladium catalyst according to the method of the invention, the loss of palladium in the synthesis of alkyleneglycol esters is almost completely prevented.

The alkali metal hydroxides which can be used in the invention include sodium hydroxide, lithium hydroxide, potassium hydroxide and the like. The alkali metal cyanides to be used in the invention include sodium cyanide, potassium cyanide and the like. It is not necessary to use these alkali metal hydroxides and alkali metal cyanides as a particularly highly concentrated aqueous solution. They may be used as an aqueous solution with a concentration as low as 0.1 mol/liter.

In case where the alkaline material is ammonia, the concentration of ammonia in aqueous solution likewise need not be necessarily high. For example, even a concentration of about 5% by weight is quite effective.

An aqueous solution containing two, or more than two, of the above-named alkaline compounds is also effective.

The temperature at which the precipitated palladium compound can be dissolved in said alkaline aqueous solution ranges from about −5° C. to above 100° C. Generally, a preferable temperature range is from room temperature to 100° C.

By reducing the palladium compound dissolved in said alkaline aqueous solution as above, metallic palladium can be obtained. The reducing agents suitable for the practical use include hydrazine, hydrogen ($H_2$), and formaldehyde; but other reducing agents may also be used. The temperature and other conditions for the reduction are not precisely limited, and ordinary reduction conditions may be employed. For example, the reduction may be carried out at a temperature of from about −5° C. to about 80° C. The amount of the reducing agent required for the reduction may vary over a wide range and will be determined by the desired yield of palladium metal, taking into consideration the kind of the reducing agent and the concentration of palladium compound dissolved in the aqueous solution.

In order to recover palladium black in a sufficiently high yield, it is recommended to continue the reduction until palladium ion is no longer detected in the aqueous solution.

The method of the invention can be effectively applied to the recovery of palladium from all the precipitated palladium compound which is formed during the synthesis of alkyleneglycol esters, without being adversely affected by the types of the palladium catalysts, nitrogen-oxygen-containing compounds, olefins and carboxylic acids used for the reaction of synthesizing alkylene-glycol esters. For example, the palladium catalysts used in said reaction of synthesizing alkyleneglycol esters may be metallic palladium or any of palladium compounds soluble under the reaction conditions, such as palladium chloride, palladium nitrate, sodium palladium chloride and a palladium caboxylate (e.g., palladium acetate).

The nitrogen-oxygen-containing compounds may be any of nitric acid; nitrous acid, nitrogen oxides such as nitrogen monoxide (NO); nitrogen dioxide ($NO_2$); metal nitrates such as lithium nitrate, sodium nitrate, potassium nitrate, calcium nitrate, barium nitrate, cupric nitrate, ferric nitrate; and metal nitrites such as lithium nitrite, sodium nitrite and the like. It is preferred to conduct the oxidation reaction in the presence of added molecular oxygen.

The olefins which may be used in the alkyleneglycol ester synthesis include ethylene, propylene, 1-butene and similar alpha monoolefins.

The carboxylic acids include acetic acid, propionic acid, butyric acid and similar lower aliphatic monocarboxylic acids. The precipitated palladium compounds formed in the reaction of synthesizing alkyleneglycol esters through any combinations of these catalysts, nitrogen-containing oxidizing agents (i.e. nitrogen-oxygen-containing compounds), olefins and carboxylic acids, can be recovered in the form of metallic palladium according to the method of the invention. Further, the precipitated palladium compounds formed in the presence of various metal carboxylates and metal halides, besides the above-mentioned components in said reaction system for synthesizing alkyleneglycol esters, can also be similarly recovered by the method of the invention.

The invention will be illustrated by the following examples which are intended for illustrative purposes only.

EXAMPLE 1

Into a 4-necked flask equipped with an airtight stirrer, reflux condenser, gas inlet and thermometer was charged 50 milliliters of glacial acetic acid solution containing 0.5 millimole (=0.01 mol/liter) of sodium palladium chloride and 25 millimoles (=0.5 mol/liter) of lithium nitrate, the charged material being maintained at 50° C. with stirring. Ethylene (at a flow rate of 2 liters/hour) and oxygen (at a flow rate of 2 liters/hour) were introduced into the system. After 3 hours reaction with stirring, ethyleneglycol monoacetate was produced in the reaction liquid at a concentration of 3.8 mol/liter, and a fine yellowish precipitate was suspended in the reaction liquid. Said precipitate was separated from the reaction mixture by filtration with the use of a glass filter, and washed with acetic acid and water, followed by drying and weighing to find that the amount of the precipitate was 0.021 gram. By adding 5 milliliters of an aqueous solution of two normal (2N) sodium hydroxide to the precipitate and heating the resultant mixture at 80° C. the precipitate easily dissolved. To the resulting solution, 1.5 milliliters of an aqueous solution of hydrazine (concentration of hydrazine being 50% by weight) was added to reduce the dissolved palladium compound to palladium black, whereby palladium black was precipitated. By separating said palladium black by filtration from the aqueous solution, 0.012 g. of palladium black was recovered.

EXAMPLE 2

Into a 37 ml cylindrical reactor, a glacial acetic acid solution containing palladium chloride (0.03 mol/liter), lithium chloride (0.04 mol/liters) and lithium nitrate (0.7 mol/liter) was continuously supplied upward at a flow rate of 17 milliliters per hour, and the solution was continuously contacted at 60° C. with propylene (2.0 liters/hour) and oxygen (2.0 liters/hour) which were also supplied upward. The liquid reaction mixture removed from the reactor contained a precipitate in an amount of 1.6 gram/liter and propyleneglycol monoacetate at a concentration of 2.03 mol/liter, and the concentration of palladium dissolved therein decreased to 0.021 mol/liter. The precipitate contained in said reaction mixture was separated by filtration and washed. 2.1 grams of the precipitate thus obtained was dissolved in 50 milliliters of an aqueous ammonia solution (the ammonia concentration being 28% by weight) at 40° C. Into the resultant solution, hydrogen ($H_2$) was introduced at a rate of 3.0 liters per hour at 25° C. for 3 hours, whereby palladium black was precipitated. The palladium black was separated by filtration from the aqueous solution and thoroughly washed with acetic acid. The yield of palladium black was 1.3 grams. The palladium black thus recovered and washed was dissolved in a glacial acetic acid solution containing lithium nitrate (0.7 mol per liter) at 100° C. in an amount of 0.03 mol per liter and the resulting mixture was subjected to the reaction with propylene again to confirm that the catalytic activity was completely regained, producing propylene-glycol monoacetate.

EXAMPLE 3

Into a 4-necked flask (of 500 milliliters capacity) with the same equipment as was used in Example 1 was supplied 300 milliliters of glacial acetic acid containing 0.02 mol/liter (= about 6.7 millimoles) of palladium acetate and 0.6 mol/liter (= about 182 millimoles) of nitric acid, into which 1-butene (at a flow rate of 5 liters per hours) and oxygen (at a flow rate of 4 liters per hour) were introduced at 60° C. for reaction. After 10 hours reaction, 1,2-butyleneglycol monoacetate at a concentration of 0.95 mol/liter was produced in the reaction mixture along with a large amount (about 0.9 grams) of yellow precipitate. The precipitate easily dissolved at 50° C. in 40 milliliters of an aqueous solution of sodium cyanide (sodium cyanide concentration; 3% by weight), and by reducing it at 35° C. with 2.5 milliliters of an aqueous solution of hydrazine (hydrazine concentration, 48% by weight), palladium black was precipitated and subsequently recovered by separating it from the aqueous solution. The yield of palladium black was 0.49 grams.

EXAMPLE 4

Into a 4-necked flask (of 100 milliliters capacity) with the same equipment as was used in Example 1 was placed 50 milliliters of glacial acetic acid containing 2 millimoles (= 0.04 mol/liter) of palladium chloride, 4 millimoles (= 0.08 mol/liter) of lithium chloride, 15 millimoles (= 0.3 mol/liter) of nitric acid, 15 millimoles (=0.3 mol/liter) of lithium nitrate and 10 millimoles (= 0.2 mol/liter) of lithium acetate. Propylene (at a flow rate of 2.5 liters per hour) and oxygen (at a flow rate of 2.5 liters per hour) were introduced at 60° C. for reaction. After 5 hours reaction, propyleneglycol monoacetate at a concentration of 2.15 mol/liter was produced in the reaction liquid. Also produced was a large amount (about 0.1 grams) of a yellow precipitate, and the concentration of palladium dissolved in the reaction liquid decreased to 0.026 mol/liter. The precipitate was separated by filtration and dissolved in 10 milliliters of an aqueous solution of potassium cyanide (potassium cyanide concentration; 4% by weight) at room temperature, and then reduced with 1.5 milliliters of an aqueous solution of hydrazine (hydrazine concentration; 50% by weight), whereby palladium black was obtained, and recovered by separating it from the aqueous solution. The yield of palladium black was 0.052 grams.

What is claimed is:

1. A method of recovering palladium from a precipitate formed during synthesis of an alkyleneglycol ester by contacting a carboxylic acid solution containing a palladium catalyst which is soluble under the reaction conditions with an olefin in the presence of a nitrogen-oxygen-containing compound selected from the group consisting of nitric acid, nitrous acid, nitrogen oxides, metal nitrates and metal nitrites which comprises dissolving said precipitate in an aqueous solution of at least one alkaline compound selected from the group consisting of alkali metal hydroxides, alkali metal cyanides and ammonia, reducing the palladium compound dissolved in the aqueous solution to form metallic palladium and separating said metallic palladium from the aqueous solution.

2. A method according to claim 1 wherein the nitrogen-oxygen-containing compound is a metal nitrate.

3. A method according to claim 1 wherein the nitrogen-oxygen-containing compound is nitric acid.

4. A method according to claim 1 wherein the olefin is an alpha-monoolefin.

5. A method according to claim 1 wherein the carboxylic acid is a lower aliphatic monocarboxylic acid.

6. A method according to claim 1 wherein the alkyleneglycol ester synthesis is carried out in the presence of molecular oxygen.

* * * * *